United States Patent
Welch et al.

(10) Patent No.: US 6,350,333 B1
(45) Date of Patent: Feb. 26, 2002

(54) LAMINATOR FOR CORRUGATED PAPERBOARD SHEETS

(75) Inventors: Harold D. Welch; Dennis L. Lemke; Alan J. Pipkorn; James A. Wiedenhoeft, all of Phillips, WI (US)

(73) Assignee: Marquip, LLC, Phillips, WI (US)

( * ) Notice: Subject to any disclaimer, the term of this patent is extended or adjusted under 35 U.S.C. 154(b) by 0 days.

(21) Appl. No.: 08/409,468

(22) Filed: Mar. 23, 1995

(51) Int. Cl.⁷ .................................................. B31F 5/04
(52) U.S. Cl. ...................... 156/64; 156/210; 156/353; 156/355; 156/362; 118/258
(58) Field of Search ....................... 156/64, 210, 353, 156/355, 362; 118/258

(56) References Cited

U.S. PATENT DOCUMENTS

| | | | | |
|---|---|---|---|---|
| 2,008,974 A | * | 7/1935 | Weber ...................... 156/302 X |
| 3,306,805 A | * | 2/1967 | Klein et al. ................. 156/470 |
| 3,567,554 A | | 3/1971 | Klein et al. |
| 3,591,436 A | * | 7/1971 | Klein et al. .............. 156/470 X |
| 3,775,211 A | * | 11/1973 | Gill ............................ 156/205 |
| 5,049,216 A | * | 9/1991 | Shead et al. .................. 156/64 |
| 5,248,362 A | * | 9/1993 | Sissons ...................... 156/205 |
| 5,300,160 A | * | 4/1994 | Wilson et al. ................ 156/64 |
| 5,437,749 A | * | 8/1995 | Pipkorn et al. ............... 156/64 |
| 5,437,752 A | * | 8/1995 | Lang ........................... 156/210 |

FOREIGN PATENT DOCUMENTS

| | | |
|---|---|---|
| FR | 1482159 | 8/1967 |
| FR | 2026692 | 9/1970 |

* cited by examiner

*Primary Examiner*—Jill Warden
(74) *Attorney, Agent, or Firm*—Andrus Sceales Strake & Sawall

(57) ABSTRACT

A laminator for applying pre-printed labels to a single face corrugated web to form double face corrugated sheets utilizes a control system including accurate leading and trailing edge detection of the labels to custom cut the corrugated web to match the label length in a manner which assures complete and uniform coverage of the glued flute tips of the corrugated web by the labels. The labels are fed non-stop as a series of spaced sheets into a laminating nip to join the leading edge of the traveling single face corrugated web. A positioning nip upstream of the laminating nip varies the speed of the incoming sheets to accurately match sheet leading edge to web leading edge. Detection of the sheet trailing edge triggers operation of the web cut-off knife to accurately match the corresponding cut trailing edge.

12 Claims, 2 Drawing Sheets

LAMINATOR FOR CORRUGATED PAPERBOARD SHEETS

BACKGROUND OF THE INVENTION

The present invention pertains to a laminator or combiner for forming corrugated paperboard sheets from a single face web and discrete cover sheets and, more particularly, to such a system utilizing cover sheets which comprise serially fed pre-printed labels.

It has not been practical or possible to utilize the full capabilities of modern printing equipment to print and/or decorate the outside face of a corrugated paperboard carton blank made in a conventional double face corrugating system. The basic reason for the difficulty is the need to use a web-fed printer to print the single face web which is to become the outside liner of the corrugated boxes made from the double face corrugated web. It has long been recognized that, if the outside liner for the corrugated carton blanks could be made from discrete pre-printed sheets, the enhanced versatility of sheet-fed printers could be used to provide printed cartons with virtually any desired pattern of printing and/or decoration. Such a process would thus apply serially fed pre-printed cover sheets or labels to be joined to the exposed flute tips of a single face corrugated web by passing the two between a laminating roll, with a suitable adhesive having been applied upstream to the flute tips.

U.S. Pat. No. 3,591,436 operates by feeding pre-printed sheets in end-to-end abutment or, preferably, with their adjacent edges overlapping slightly into a laminating nip through which a glued single face adhesive web is also passing, such that the printed sheets complete the formation of a substantially continuous double face corrugated web. The use of conventional starch-based paperboard adhesive requires the double face web to be passed through a drying section, after which individual double face corrugated sheets are cut by passing the web through a rotary cut-off knife operated in response to marks on the pre-printed labels. Edge-to-edge abutment or slight overlap of the pre-printed sheets is important to prevent exposure of glued flute tips on the single face web.

U.S. Pat. No. 3,775,211 shows another laminating system in which pre-printed labels or cover sheets are fed into contact with the pre-glued flute tips of a single face web and joined thereto by passage through a laminating nip. However, unlike the system of the previously described patent, the single face web is cut immediately after the leading edge of the web and corresponding leading edge of the cover sheet have entered the laminating nip. Thus, a completed double face corrugated sheet, cut to length, exits from the laminating nip. Synchronization of the leading edge of the printed cover sheet to cause it to slightly overlap the leading edge of the single face web is also provided to avoid exposed adhesive on the underlying single face web. The cover sheets are fed in an overlapping or shingled relation and each sheet is momentarily stopped just upstream of the laminating nip and released by a mechanically operated timing mechanism to coordinate the desired leading edge coordination with the single face web.

In actual operation, these prior art systems cannot adequately deal with problems caused by cover sheet slippage, variations in nominal sheet length, and cumulative error problems caused by these and other factors. A laminating system which could accurately and effectively overcome these problems would be most desirable.

SUMMARY OF THE INVENTION

In accordance with the present invention, a method and apparatus are provided for rapid and accurate lamination of pre-printed cover sheets to a single face web in which the sheets are fed non-stop into a laminating nip and the single face web is custom cut to accurately match the trailing edge of the cover sheet and to compensate for variations in leading edge match of the two components entering the laminating nip and variations in the length of the cover sheet.

A presently preferred method for laminating discrete rectangular cover sheets to a single face corrugated web which web is severed into cut length portions to form, with the cover sheets, double face corrugated sheets includes the steps of feeding cover sheets in serially spaced relation from a cover sheet supply non-stop into a downstream laminating nip; feeding the single face web from a web source, through a cut-off knife positioned less than one sheet length from the laminating nip, and into said nip; passing each cover sheet through a variable speed positioning nip located less than one sheet length upstream of the laminating nip; controlling the speed of the positioning nip to cause the leading edge of the cover sheet traveling therein to extend at least to the leading edge of the web entering the laminating nip; sensing the position of the trailing edge of the cover sheet which is in the positioning nip; operating the cut-off knife in response to the sensed position of the trailing edge of the cover sheet to sever the web into a cut length portion such that the trailing edge of the cover sheet extends, in the upstream direction, at least to the trailing edge of the single face cut length portion; and, passing the cover sheet and cut length portion of the web through the laminating nip to form the double face corrugated sheet.

In a broad sense, the step of controlling the speed of the positioning nip may be used to provide any desired position of the leading edge of the cover sheet with respect to the leading edge of the web in a range from a direct edge-to-edge match to a maximum acceptable overlap of the cover sheet leading edge. Similarly, the operation of the cut-off knife in response to the sensed position of the cover sheet trailing edge may be utilized to provide a desired position of the cover sheet trailing edge with respect to the trailing edge of the cut length of single face in a range from direct edge-to-edge match to a maximum acceptable cover sheet trailing edge overlap.

The method of the present invention also preferably includes the step of applying an adhesive to the exposed flute tips of the corrugated web at a point upstream of the cut-off knife. The method also includes the step of guiding each cover sheet laterally during the feeding step to provide a desired position of alignment of the cover sheet side edges with respect to the lateral edges of the single face web. The method is particularly adapted to utilize cover sheets which comprise pre-printed labels.

Correspondingly, the apparatus for practicing the method of the present invention comprises means for feeding cover sheets in spaced relation and without stop from a sheet supply into a downstream laminating nip; means for feeding the single face web from a source, through a cut-off knife which is positioned less than one sheet length from the laminating nip, and into that nip; means located in the feed path of the cover sheets and positioned less than one sheet length upstream of the laminating nip for varying the speed of the cover sheet which is passing through the speed varying means; means for controlling the operation of the speed varying means to cause the leading edge of the cover sheet to extend at least to the leading edge of the web entering the laminating nip; means for sensing the position of the cover sheet trailing edge as it passes through the speed varying means; means for operating the cut-off knife in response to the sensed position of the cover sheet trailing edge to sever the web into a cut length portion such that the trailing edge of the cover sheet extends upstream at least to the severed trailing edge of the single face cut length portion; and means for passing the cover sheet and cut length portion of the web through the laminating nip to form the double face corrugated sheet. The speed varying means preferably comprises a variable speed positioning nip.

DETAILED DESCRIPTION OF THE PREFERRED EMBODIMENTS

Figure 1:
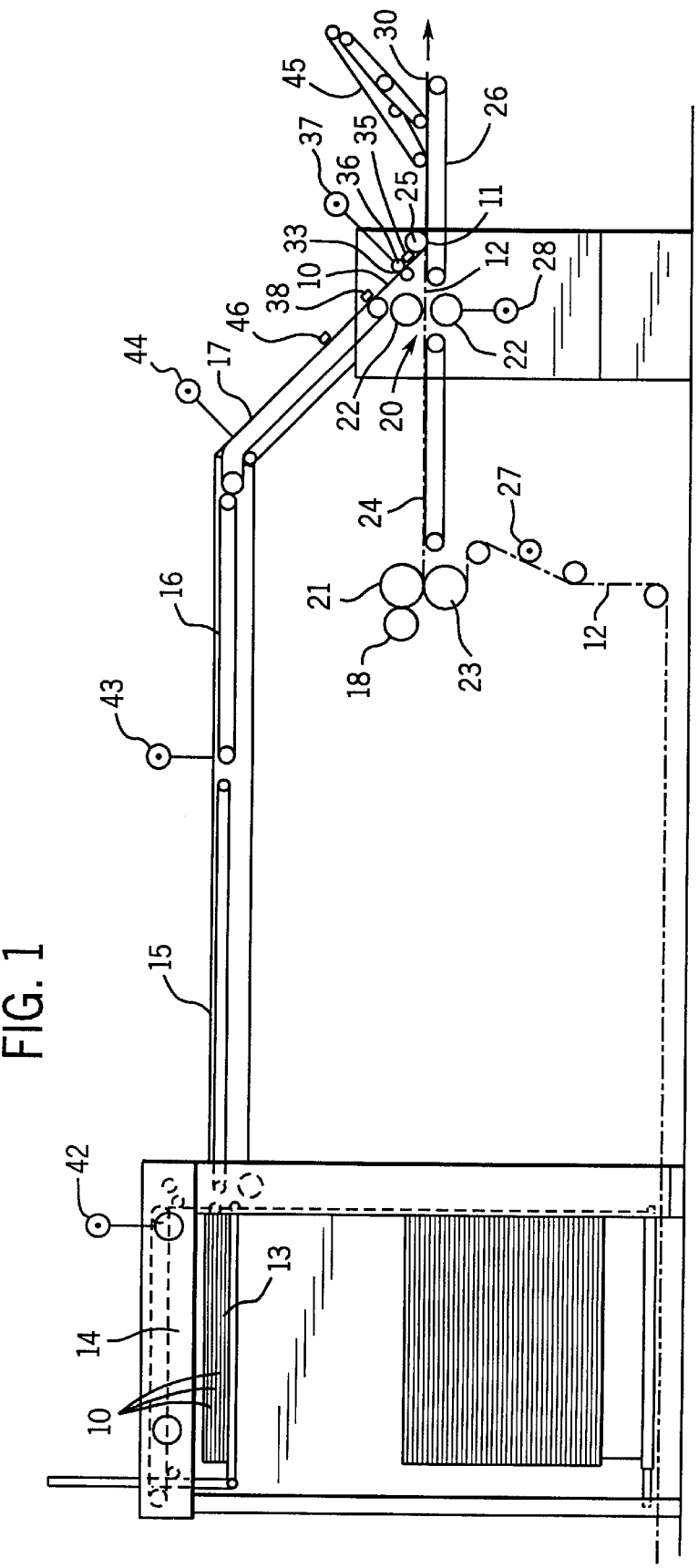
FIG. 1 is a schematic side elevation of the laminating apparatus of the present invention.

Referring initially to FIG. 1, the object of the laminating system shown therein is to provide discrete pre-printed sheets 10 in a non-stop serial progression to a downstream laminating nip 11 where each sheet is matched to the cut leading edge of a single face web 12 which, after nipping with the sheet, is cut to match the trailing edge of the sheet as the two pass through the laminating nip and are bonded together. The result is a pre-printed double face corrugated sheet in which the cover sheet completely overlies the glued flute tips of the underlying cut portion of the single face web, so that there is no exposed adhesive to interfere with subsequent processing.

The sheets 10 are supplied from a vertical stack 13 from which a feeder 14 at the top of the stack feeds the sheets in serially spaced relation onto an upstream belt conveyor 15. The belt conveyor preferably includes vacuum holddown to positively maintain the relative positions of the sheets 10 traveling along it. From the upstream vacuum belt conveyor 15, the sheets pass through a side guide conveyor 16 where the lateral edges are aligned precisely with the lateral edge of the single face web 12 to which they will be eventually joined. After side edge alignment, the sheets pass to a downstream vacuum belt conveyor 17 which includes a downwardly inclined portion to direct sheets toward the laminating nip 11.

The single face web 12 may be provided from a storage roll or may be taken directly from a single facer (neither of which is shown) from which the web is fed continuously into the laminating nip 11, after intermediate travel through a glue applicator 18 and cut-off knife 20. Both the glue applicator and cut-off knife are of conventional construction. The glue applicator 18 includes a glue roll 21 which applies an adhesive to the exposed flute tips of the corrugated medium of the single face web 12. The cut-off knife 20 includes a pair of knife cylinders 22 each of which carries a spiral knife blade adapted to engage and provide a transverse cut to sever the web 12 on command as it travels between the knife cylinders 22.

The primary driving force for the single face web 12 is provided by a driven pull roll 23 which operates opposite the glue roll 21. Under normal operating conditions, the web 12 is driven at a constant speed through the cut-off knife 20 and is supported between the pull roll and cut-off knife by infeed vacuum belt conveyor 24 operating at 110% web speed. However, until the web is cut, the pull roll controls to maintain web speed. From the cut-off knife, the web moves into the laminating nip 11 which includes an upper laminating roll 25 and a lower exit vacuum belt conveyor 26. Exit belt conveyor 26 is operated at 10% overspeed (110% of web speed), but until the cut-off knife 20 is operated to sever a leading cut length portion from the single face, movement of the lead end of the web through the laminating nip continues at web speed. Once the web has been severed by the cut-off knife, the overspeed operation of the exit vacuum belt 26 and laminating roll 25 causes a gap to be formed between the trailing edge of the cut length portion of the web and the newly formed web leading edge.

Just upstream of the pull roll 23, a web resolver is positioned in contact with the running web to provide a continuous measure of single face travel at the fixed web speed. Web resolver 27 may be considered to be the master resolver and, as will be described in greater detail, a knife resolver 28 and a series of resolvers used on the sheet feed line are all keyed to operate with or in response to signals from web resolver 27.

Figure 2:
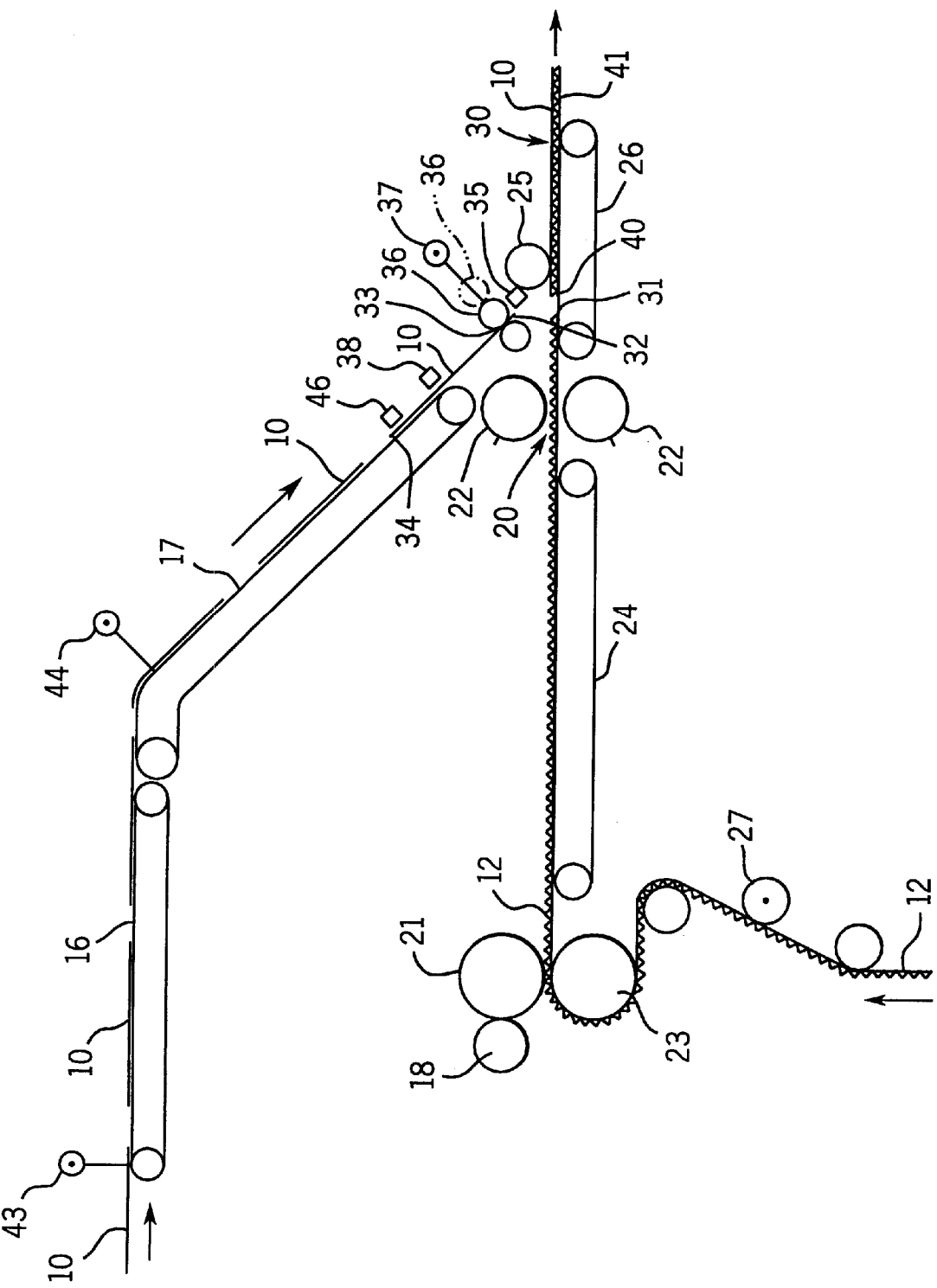
FIG. 2 is an enlarged detail of a portion of FIG. 1.

Basic operation of the system includes feeding the sheets 10 from the feeder 14 along the upstream vacuum belt conveyor 15, side guide conveyor 16, and downstream vacuum belt conveyor 17 at a nominal constant speed which is 110% of single face web speed and at a sheet-to-sheet spacing which is nominally equal to the gap between the trailing edge of the single face cut length portion and the new leading edge of the web at approximately the point where the double face corrugated sheet 30 exits the laminating nip 11. For example, with the cut-off knife 20 spaced 20" (51 cm) from the laminating nip 11, operation of the exit vacuum belt conveyor 26 at 10% overspeed will produce a gap of about 2" (5 cm) between the trailing edge of the double face corrugated sheet 30 exiting the laminating nip 11 and the new leading cut edge 31 of the single face web 12. The feeder 14 is operated to feed sheets onto the upstream vacuum belt conveyor 15 at a speed which is also 10% overspeed with respect to single face web speed and at a spacing between sheets 10 of 10% of sheet length, e.g. 3" (7.6 cm) for 30" (76 cm) sheets. This basic relationship is better understood by referring to the detailed view of FIG. 2. However, because the single face web 12, before being cut, moves into the laminating nip at web speed, the incoming sheet 10, which must have its leading edge 32 matched to the leading cut edge 31 of the web, must be slowed to web speed for initial capture with the web leading edge in the laminating nip 11. Deceleration of the sheets from the nominal 10% overspeed to the speed of the traveling single face web 12 is provided by a variable speed positioning nip 33 positioned upstream of the laminating nip at a distance less than the minimum sheet length for which the system is designed to operate.

Although the system can be initially calibrated and operated to feed the sheets 10 at an overspeed matched to web speed and at a spacing corresponding to the gap pulled in the single face web after it is severed, product and operating conditions including sheet slippage, variations in nominal sheet length and error accumulation problems caused by these and other factors, will inevitably result in leading edge mismatch at the laminating nip. It is, therefore, an important aspect of the invention to control the speed of the positioning nip 33 in response to detection of the position of the leading edge 32 of each sheet with respect to the leading cut edge 31 of the web and to subsequently control operation of the cut-off knife 20 in response to detection of the trailing edge 34 of the sheet, all while the sheet is under direct variable speed control of the positioning nip 33. To provide these necessary control functions, a high speed leading edge photoeye 35 is positioned between the positioning nip and the laminating nip, e.g. 2" (5 cm) past the positioning nip.

The positioning nip includes an upper positioning roll 36 which, preferably, comprises a plurality of spaced, axially aligned nip wheels, which can be raised and lowered in response to command from the system controller. The system is operated to move the upper positioning roll 36 down just before the leading edge 32 of the sheet reaches the nip formed by the roll in the down position. At this point, as previously indicated, the sheet is traveling at the nominal speed of 110% of the speed of the single face web. After it has traveled 2" (5 cm) into the positioning nip, the leading edge 32 is detected by the photoeye 35 and a position signal is generated. The upper positioning roll 36, which is driven by a servo motor, includes a resolver 37 which operates to track the actual length of the sheet 10 passing through the nip. The web resolver 27 generates a web length signal which, in response to a cut signal from the knife resolver 28 provides a measurement of the distance traveled by the web leading edge 31. As indicated, the cut-off knife 20 is located at a known distance (e.g. 20") from the laminating nip which is the point where it is desired to coincide contact between the web leading edge 31 and the sheet leading edge 32.

If the system has been properly calibrated and the web and sheets are moving at the speed and spacing preset with no slippage of either, the positioning roll servo motor could be operated in response to a timing signal to slow the sheet, running at 10% overspeed, to match the web speed at the laminating nip.

However, a zero error condition is virtually impossible to attain, much less maintain over a period of continuous operation. Therefore, the signal generated by the leading edge photoeye 35 triggers operation of the positioning nip servo motor in response to the web lead edge position signal generated by the knife and web resolvers 28 and 27, respectively, to decelerate the sheet 10 to the speed of the incoming web at a rate which establishes a direct match between their respective leading edges 32 and 31. As indicated previously, it is important to assure that no exposed glued flute tips remain after the cover sheet is laminated to the web and, therefore, the system is controlled to provide a plus tolerance only of the sheet leading edge position with respect to the web leading edge position. In this manner, the leading edge of the sheet may slightly overlap the leading edge of the web, but will not fall short of full coverage.

A position signal from the web resolver 27 also causes the vacuum on the downstream vacuum belt conveyor 17 to be shut off, thereby allowing unimpeded control of sheet advance by the servo motor-driven positioning nip 33. Also, when the sheet leading edge has moved about 2" (5 cm) into the laminating nip 11 with the leading edge of the web 12, the upper positioning roll 36 is raised to remove driving contact with the sheet and the servo motor is brought back to 110% of web speed.

When the trailing edge 34 of the sheet reaches a point on the downstream belt conveyor 17 which is a known fixed distance from the positioning nip 33, a high speed trailing edge photoeye 38 is tripped to provide a trailing edge position signal. The trailing edge signal is applied to adjust the timing of operation of the cut-off knife 20 (keeping in mind that the sheet 10 and the yet-to-be cut web are both in the laminating nip 11 and traveling at the same speed) to cut the single face web and provide a single face cut length portion 41 with a trailing cut edge 40 that precisely matches the trailing edge 34 of the sheet where the two are joined in the laminating nip 11. Preferably, the knife is controlled to provide a minus only tolerance in the sense that the cut trailing edge 40 of the single face portion may be slightly short of matching the sheet trailing edge 34, but will not extend beyond the sheet (again avoiding any exposed glued flute tips).

A key feature of the system and its method of operation is thus seen to be the ability to provide a custom cut length of the single face to precisely match the trailing sheet edge. Furthermore, the overall accuracy of the control system allows a slight overlap of the sheet leading edge and a custom cut web trailing edge which will provide the same identical overlap of the cover sheet with respect to the trailing edge. Further, the edge match (or slight overlap, if desired) is totally immune from variations in the pre-cut lengths of the sheets. In addition, the control system totally eliminates any dependence of the cut trailing edge of the single face web from the prior joining of the two leading edges in the laminating nip. In other words, the relationship between the respective trailing edges 34 and 40 is unaffected by any possible error in the actual relative locations of the leading edges 31 and 32. Finally, because the sheets 10 are not stopped upstream of the laminating nip and then restarted in timed relation to the approaching single face web, overall control is substantially simplified and much more accurate.

Upstream of the glue roll 21, the single face web 12 is precisely aligned to travel on the center line of the system correspondingly, the sheets 10 being serially fed from above must also be aligned laterally to assure that there is a lateral edge match-up with the corresponding edges of the single face web 12 at the laminating nip 11. It is equally important that no glued flute tips are exposed at the lateral edges as it is on the leading and trailing edges. Thus, the side guide conveyor 16 includes any type of well known conveyor which operates with a slight skew to the direction of sheet travel and moves the sheets laterally into a vertical surface running parallel to the direction of sheet movement and positioned with respect to the edge of the single face web running below it. The vector of lateral movement imposed on the sheets in the side guide conveyor section, as well as the frictional drag imposed when the sheets engage the vertical guiding surface, tend to slow the sheets down. This slowdown is compensated for by operating the side guide conveyor 16 at a slightly higher speed than the vacuum belt conveyors 15 and 17, such that the sheets on the downstream vacuum belt conveyor, as they enter the positioning nip 33, are running at the preset speed and spacing generated at the in-feed from feeder 14, e.g. a nominal 110% overspeed with respect to the web 12 and a nominal spacing of 10% of sheet length.

The system controls are also utilized to effect start-up or re-start and utilizes features of the system to conserve labels when not laminating and to correspondingly divert single face sheets. On start-up, with the single face web 12 running, the sheet feeder 14 is set to feed sheets 10 at the appropriate ratio for the sheet length, namely, 110% of web speed and a spacing of 10% of sheet length, based on web speed signal from the web resolver 27. The sheets are fed synchronously through the upstream vacuum belt conveyor 15 and side guide conveyor 16 and onto the downstream vacuum belt conveyor 17. When the leading edge 32 of the first sheet reaches a divert photoeye 46 (upstream of the trailing edge photoeye 38), the sheet feeding conveyors are slowed and stopped with the detected leading edge at a known fixed position upstream of the positioning nip 33. Position of the sheet leading edge 32 is precisely known from outputs of the various resolvers under master control of the web resolver 27. The running web 12, which has been cut into sheets and removed from the system by the diverter 45, now has adhesive applied to the flute tips at the glue applicator 18 and the sheet feed system is re-started to bring the sheets up to 110% web speed at the leading edge photoeye 35. The re-start signal is appropriately delayed in response to a knife position signal from the cut-off knife resolver 28 to restore nominal synchronization between the web leading edge 31 and the sheet leading edge 32. Detection of the first sheet leading edge by the lead edge photoeye 35 commences continuous control as previously described. If it is necessary or desired to divert single face sheets 41, a signal from the divert photoeye 36 stops the sheet feed in the manner previously described between the divert photoeye and the positioning nip 33. This allows pre-printed sheets to be conserved and keeps track of the sheet lead edge position for re-start. Simultaneously, the diverter 45 is activated to divert the cut single face sheets.

As discussed above, the servo motor control of the positioning nip 33 to control leading edge match-up and the trailing sheet edge detection to control web cut-off utilizes basic feedback or adaptive control strategies. However, because there are inherent limits to the amount of control that can be applied to adjust the position of the sheet leading edge 32, it is desirable to maintain a tolerance of plus or minus 1 inch (2.5 cm) at the leading edge photoeye 35. This tolerance can be established with initial calibration and startup, but may be lost during continuous operation of the system. Two types of errors may eventually occur. One is an error in the sheet offset such that the sheet tends to arrive outside the 2 inch tolerance gap, either too soon or too late. This error tendency is continuously monitored by comparison of signals from the leading edge photoeye 35 and the web resolver 27 and an appropriate control signal is generated to adjust a resolver 42 on the drive for the feeder 14 to cause an appropriate shift in the timing of the feed. Corresponding changes are made to a common vacuum belt resolver 44 and a side guide drive resolver 43. The other type of error is one which is manifested by successive error accumulation with each sheet. Correction of this error requires an adjustment in the feed ratio and is effected in a similar manner.

The double face corrugated sheets 30 which exit the laminating nip 11 are processed into a stacker and bundled in a conventional manner. However, unlike the manufacture of conventional corrugated paperboard which uses a starch-based adhesive and requires significant post-laminating heating to cure, the glue applicator 18 of this system applies an adhesive which is not thermosetting. A conventional PVA adhesive has been found to be suitable. The single face web 12, of course, may be made in the conventional manner using a starch adhesive.

We claim:

1. A method for laminating discrete cover sheets to a single face corrugated web which web is cut to length to form double face corrugated sheets, said method comprising the steps of:
   (1) feeding cover sheets in serially spaced relation from a cover sheet source into a downstream laminating nip;
   (2) feeding the single face web from a web source, through a cut-off knife positioned less than one sheet cut length from said downstream laminating nip, and into said nip;
   (3) directing each cover sheet through a variable speed positioning nip located less than one sheet cut length upstream of said laminating nip;
   (4) controlling the speed of the positioning nip to provide a desired position of the leading edge of the cover sheet therein with respect to the leading edge of the web in the laminating nip;
   (5) sensing the position of the trailing edge of the cover sheet in the positioning nip; and,
   (6) operating the cut-off knife in response to the sensed position of the cover sheet trailing edge to sever the web to provide a single face cut length trailing edge having a desired position with respect to said cover sheet trailing edge.

2. The method as set forth in claim 1 including the step of applying an adhesive to the exposed flute tips of the corrugated web upstream of the cut-off knife.

3. The method as set forth in claim 1 including the step of guiding each cover sheet laterally during the feeding step to provide a desired position of the cover sheet side edges with respect to the lateral edges of the single face web.

4. The method of claim 1 wherein the cover sheets comprise pre-printed labels.

5. A method for laminating discrete rectangular cover sheets to a single face corrugated web which is severed into cut length portions to form, with said cover sheets, double face corrugated sheets, said method comprising the steps of:
   (1) feeding cover sheets in serially spaced relation from a cover sheet supply non-stop into a downstream laminating nip;
   (2) feeding the single face web from a web source, through a cut-off knife positioned less than one sheet length from said laminating nip, and into said nip;
   (3) passing each cover sheet through a variable speed positioning nip located less than one sheet length upstream of said laminating nip;
   (4) controlling the speed of the positioning nip to cause the leading edge of the cover sheet therein to extend at least to the leading edge of the web entering the laminating nip;
   (5) sensing the position of the trailing edge of the cover sheet in the positioning nip;
   (6) operating the cut-off knife in response to the sensed position of the cover sheet trailing edge to sever the web into a cut length portion to cause the trailing edge of the cover sheet to extend in the upstream direction at least to the trailing edge of the single face cut length portion; and,
   (7) passing the cover sheet and cut length portion of the web through the laminating nip to form the double face corrugated sheet.

6. The method as set forth in claim 5 wherein the step of controlling the positioning nip speed provides an overlap in the downstream direction of the leading edge of the cover sheet therein with respect to the leading edge of the web.

7. The method as set forth in claim 6 wherein the step of operating the cut-off knife provides an overlap by the cover sheet trailing edge of the trailing edge of the single face cut length portion substantially equal to the overlap in the downstream leading edge.

8. The method as set forth in claim 5 including the step of applying an adhesive to the exposed flute tips on the single face web upstream of the cut-off knife.

9. An apparatus for laminating discrete rectangular cover sheets to a single face corrugated web which web is severed into cut length portions to form, with said cover sheets, double face corrugated sheets, said apparatus comprising:
   means for feeding cover sheets in serially spaced relation and without stop from a cover sheet supply into a downstream laminating nip;
   means for feeding the single face web from a web source, through a cut-off knife positioned less than one sheet length from the laminating nip, and into said nip;
   means in the feed path of the cover sheets located less than one sheet length upstream of the laminating nip for varying the speed of the cover sheet passing therethrough;

means for controlling the operation of the speed varying means to cause the leading edge of the cover sheet therein to extend at least to the leading edge of the web entering the laminating nip;

means for sensing the position of the trailing edge of the cover sheet in the speed varying means;

means for operating the cut-off knife in response to the sensed position of the cover sheet trailing edge to sever the web into a cut length portion such that the trailing edge of the cover sheet extends in the upstream direction at least to the severed trailing edge of the single face cut length portion; and, means for passing the cover sheet and cut length portion of the web through the laminating nip to form the double face corrugated sheet.

10. The apparatus as set forth in claim 9 wherein the means for varying the speed of the cover sheet comprises a variable speed positioning nip.

11. A method for coordinating the start-up of a system for laminating discrete cover sheets to a single facer corrugated web which web is cut to length to form double face corrugated sheets, said method comprising the steps of:

(1) feeding the single face web from a web source, through a cut-off knife positioned less than one sheet cut length from a downstream laminating nip, and into said nip;

(2) initially operating the cut-off knife to cut the web into cut length portions approximately equal in length to the cover sheets;

(3) positioning a supply of cover sheets in serially spaced relation on a conveyor defining a feed path into said laminating nip;

(4) operating the feed path conveyor in response to a knife position signal to convey the sheets at an initial speed greater than the web speed and in serially spaced relation;

(5) directing a lead sheet through a variable speed positioning nip located less than one sheet in cut length upstream of said laminating nip; and, (6) controlling the speed of the positioning nip in response to a sheet leading edge signal and a web leading edge signal to decelerate said lead sheet at a rate that provides a desired position of the leading edge of the sheet therein with respect to the leading edge of the web in the laminating nip.

12. The method as set forth in claim 11 wherein the step of positioning the supply of cover sheets includes the steps of:

(1) detecting the leading edge of the lead sheet in the supply, and (2) stopping the feed path conveyor with said leading edge positioned a known distance from said laminating nip.

\* \* \* \* \*